(12) United States Patent
Auger

(10) Patent No.: US 9,582,700 B2
(45) Date of Patent: *Feb. 28, 2017

(54) POINT-OF-SALE SCANNER

(71) Applicant: CVS Pharmacy, Inc., Woonsocket, RI (US)

(72) Inventor: Raymond W. Auger, North Scituate, RI (US)

(73) Assignee: CVS PHARMACY, INC., Woonsocket, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,148

(22) Filed: Jan. 5, 2016

(65) Prior Publication Data

US 2016/0154985 A1 Jun. 2, 2016

Related U.S. Application Data

(63) Continuation of application No. 14/520,598, filed on Oct. 22, 2014, now Pat. No. 9,235,836.

(Continued)

(51) Int. Cl.
| | | |
|---|---|---|
| H04N 1/40 | (2006.01) | |
| G06K 7/10 | (2006.01) | |
| G06Q 20/20 | (2012.01) | |
| H04N 1/00 | (2006.01) | |
| H04N 1/028 | (2006.01) | |

(Continued)

(52) U.S. Cl.
CPC ..... *G06K 7/10881* (2013.01); *G06K 7/10564* (2013.01); *G06K 7/1447* (2013.01); *G06K 19/0614* (2013.01); *G06Q 20/204* (2013.01); *G07D 7/12* (2013.01); *G07D 7/2033* (2013.01); *G07F 7/086* (2013.01); *H04N 1/00005* (2013.01); *H04N 1/02815* (2013.01); *H04N 2201/0081* (2013.01); *H04N 2201/0096* (2013.01)

(58) Field of Classification Search
CPC ... H04N 2201/3233; H04N 2201/3235; G07D 7/20; G07D 7/122; G07D 7/12; G07D 7/00; G07D 7/205; G03H 1/0011; B41M 3/144; G06Q 20/3674
USPC ....... 358/2.1, 1.9, 474, 468, 448, 1.15, 1.18; 382/135, 112, 137
See application file for complete search history.

(56) References Cited

U.S. PATENT DOCUMENTS

| | | | |
|---|---|---|---|
| 4,359,633 A | | 11/1982 | Bianco |
| 5,296,949 A | * | 3/1994 | Pennace .................. G07F 7/086 359/2 |

(Continued)

FOREIGN PATENT DOCUMENTS

| | | | | |
|---|---|---|---|---|
| CN | 202093594 U | * | 12/2011 | |
| DE | 102004045708 A1 | * | 3/2006 | ............... G06K 7/12 |
| WO | WO 0004516 A1 | * | 1/2000 | ......... G07C 9/00071 |

*Primary Examiner* — Thomas D Lee
*Assistant Examiner* — Stephen Brinich

(57) ABSTRACT

A method of verifying the authenticity of an identification card, including capturing, with a point-of-sale scanner, a first image of the identification card, configuring an ultraviolet filter mounted within the point-of-sale scanner to allow the passage of ultraviolet light within, illuminating the identification card with ultraviolet light, capturing, with the point-of-sale scanner, a second image of the identification card, and determining if the identification card is authentic by analyzing the first and second images.

19 Claims, 3 Drawing Sheets

Related U.S. Application Data

(60) Provisional application No. 61/894,111, filed on Oct. 22, 2013.

(51) Int. Cl.
    *G07D 7/12*     (2016.01)
    *G07F 7/08*     (2006.01)
    *G07D 7/20*     (2016.01)
    *G06K 7/14*     (2006.01)
    *G06K 19/06*     (2006.01)

(56) References Cited

U.S. PATENT DOCUMENTS

| | | | |
|---|---|---|---|
| 5,331,140 A * | 7/1994 | Stephany | G06K 7/12 235/462.06 |
| 5,640,463 A * | 6/1997 | Csulits | B65H 3/063 194/207 |
| 5,856,048 A | 1/1999 | Tahara et al. | |
| 5,867,586 A * | 2/1999 | Liang | G06K 7/12 283/92 |
| 6,165,937 A | 12/2000 | Puckett et al. | |
| 8,944,234 B1 | 2/2015 | Csulits et al. | |
| 2001/0048027 A1 | 12/2001 | Walsh | |
| 2002/0030112 A1 | 3/2002 | Schreiber | |
| 2003/0016290 A1 | 1/2003 | Kwon | |
| 2005/0148890 A1 | 7/2005 | Hastings | |
| 2007/0057764 A1* | 3/2007 | Sato | G06K 9/00006 340/5.52 |
| 2008/0106726 A1 | 5/2008 | Park | |
| 2009/0294244 A1 | 12/2009 | Charych et al. | |
| 2010/0315693 A1* | 12/2010 | Lam | G02B 5/23 359/241 |
| 2011/0063430 A1* | 3/2011 | Hyun | G06K 9/00013 348/77 |
| 2012/0075442 A1* | 3/2012 | Vujic | G07C 9/00087 348/61 |
| 2013/0070090 A1 | 3/2013 | Bufalini et al. | |
| 2013/0234043 A1 | 9/2013 | Hussain et al. | |

* cited by examiner

POINT-OF-SALE SCANNER

CROSS-REFERENCE TO RELATED APPLICATIONS

This application is a continuation of and claims priority to U.S. patent application Ser. No. 14/520,598, filed Oct. 22, 2014, now U.S. Pat. No. 9,235,836, which claims priority to U.S. Provisional Patent Application No. 61/894,111, filed Oct. 22, 2013, the disclosures of which are hereby incorporated by reference herein in their entirety.

A cashier, clerk, or other operator of a point-of-sale ("POS") may need to verify the age and/or identity of a customer who is attempting to purchase an item for which such verification is required. Such items may include alcohol, tobacco or tobacco products, pharmaceuticals containing pseudoephedrine or other drugs; and other regulated goods and services. The verification may be required by a local, state, or federal government or agency and/or by store or company policy.

One way to effect such verification is by inspection of a driver's license, voter ID card, or other form of identification belonging to the customer to confirm the customer's identity and age. In addition, a hologram or other similar element embedded into the identification card may be inspected to determine the authenticity of the identification card. Existing systems bathe the identification card in ultraviolet ("UV") light, thereby stimulating the hologram to fluoresce light in the visible spectrum. A camera or similar photosensor captures an image of the stimulated hologram, analyzes the image, and determines whether the identification card is authentic.

Existing UV scanners may present several disadvantages and deficiencies that make their integration with existing POS systems impossible, inconvenient, and/or cost-prohibitive, especially for POS systems that need only verify identification cards infrequently. Such UV scanners may be hardware-incompatible with conventional POS systems, for example, and/or their driver, interface, or operating software may be incompatible with the POS software. Furthermore, a UV scanner represents yet another device that the POS operator must be trained on, manage, and store when not in use. A need therefore exists for UV scanners that are more compatible with POS systems.

BRIEF DESCRIPTION OF THE DRAWINGS

In the drawings, like reference characters generally refer to the same parts throughout the different views. In the following description, various embodiment of the present invention are described with reference to the following drawings, in which.

DETAILED DESCRIPTION

Described herein are various embodiments of methods and systems for verifying the authenticity of an identification card at a POS terminal. In various embodiments, an infrared ("IR") scanner used for scanning universal product codes ("UPCs") includes a source of UV light; the scanner may also be used to capture an image of an identification card whilst being exposed to said UV illumination. The captured image may then be analyzed to determine the authenticity of the identification card.

Figure 1:
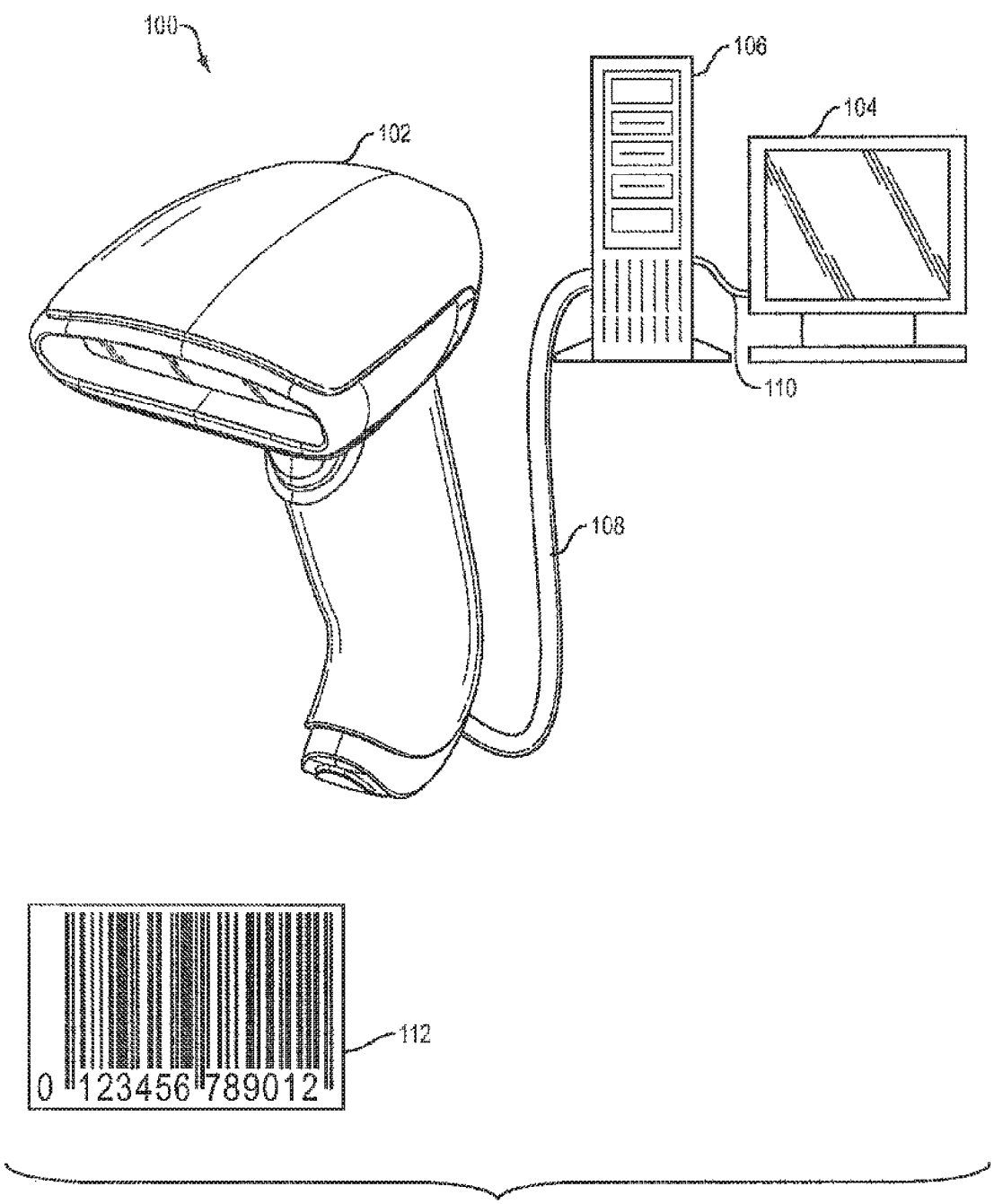
FIG. 1 illustrates a point-of-sale system in accordance with an embodiment of the present invention.

FIG. 1 illustrates a POS system 100 that includes a handheld scanner 102, a display 104, and a computer system 106. The scanner 102 communicates with the computer 106 via a first wired link 108, and the computer 106 communicates with the display 104 via a second wired link 110. In other embodiments, either or both of the wired links 108, 110 are wireless links (using, e.g., a Wi-Fi or BLUETOOTH connection).

The POS system 100 may be used to identify one or more items that a customer wishes to purchase by directing the scanner 102 toward a UPC (such as the UPC 112) attached to or associated with the item(s); other identification markings, such as numbers, symbols, or 2D barcodes may be used instead of or in addition to the UPC. The scanner 102 emits IR light toward the UPC 112 and captures a reflection of said light, thereby scanning and reading the numbers encoded in the UPC 112 via any means known in the art. The POS system 100 may provide such features as displaying information about the scanned items on the display 104; the scanning of coupons, rewards, or discount cards; accepting payment via cash, credit, or checks; the retrieval of customer information from a remote server; and/or any other such features as are typically provided by POS systems. The scanner 102 may contain hardware and/or software for the performance of some or all of the above-identified features; in other embodiments, the scanner 102 transmits raw data (e.g., image data) to the computer 106 for analysis thereon. The POS system 100 is exemplary only and not intended to be limiting; any POS system known in the art is within the scope of the present invention.

Figure 2:
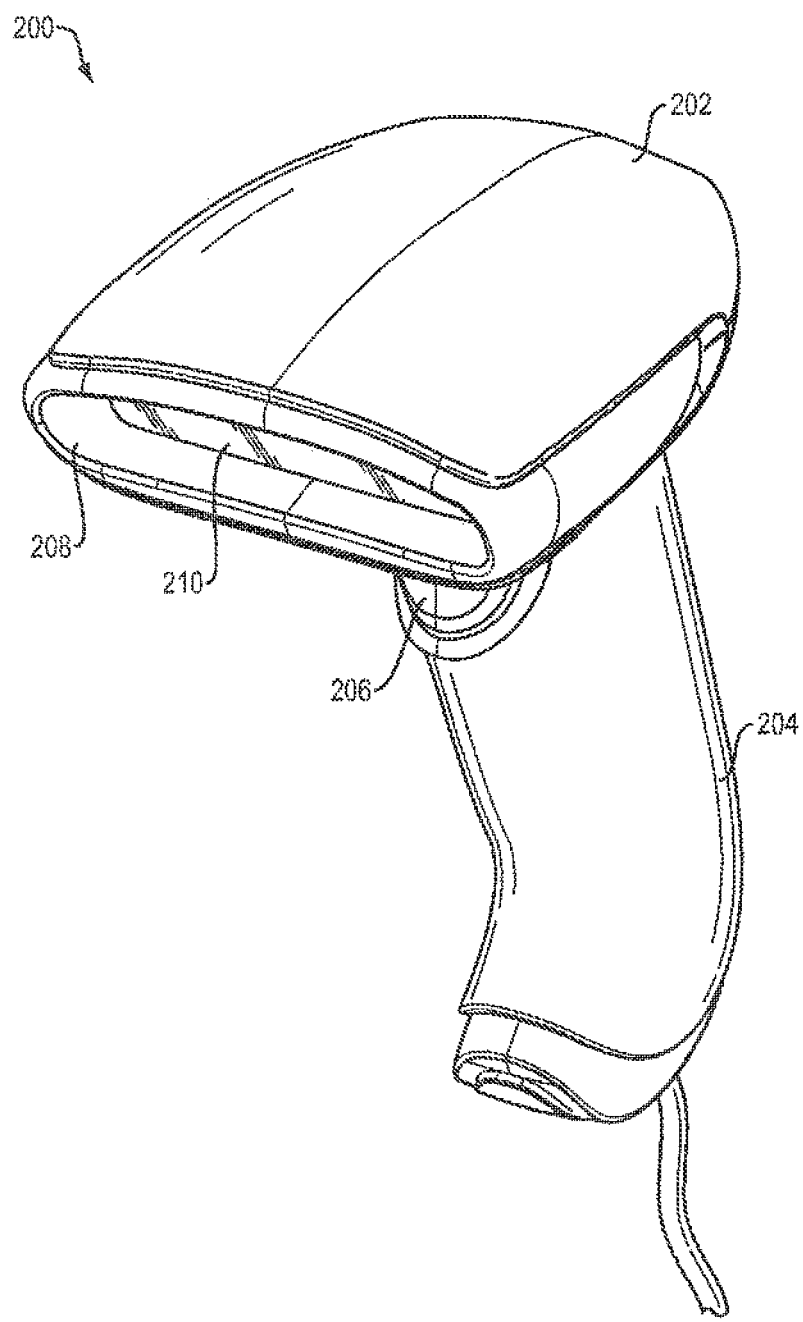
FIG. 2 illustrates a point-of-sale scanner in accordance with an embodiment of the present invention.

One embodiment of a scanner 200 is illustrated in FIG. 2. The scanner 200 includes a main housing 202, a handgrip 204, a trigger switch 206, and a front face 208. The front face 208 includes a transparent or translucent window 210. The window 210 allows IR, UV, and/or other light or energy to pass therethrough. A user may activate the trigger 206 to initiate a scan of an UPC associated with an item for purchase.

In some embodiments, an item that a customer wishes to purchase requires verification of the customer's age or identity. Such items may include alcohol or tobacco products, which may require that the customer be a certain minimum age (e.g., 18 or 21 years old) as defined by local, state, or federal law or regulation and/or the corporate policy of the corporation or other entity selling the product. Other items, such as pseudoephedrine, may require identification of the customer (e.g., name and address) for purposes of tracking sales of the items and thereby limiting sales to a certain maximum number of units to a given customer.

If a customer attempts to purchase one or more of these restricted items, the scanner 200 may identify the items as restricted upon the scanning of a UPC code associated with the item(s). As described in greater detail below, the scanner 200 (and/or the POS system 100 of FIG. 1) may prompt the operator of the POS system 100 to scan an identification card (such as a driver's license) belonging to the customer; the scanner 200 may then emit UV light to thereby illuminate the identification card, scan on image of the UV-illuminated card, and thereafter determine if the identification card is authentic.

Figure 3:
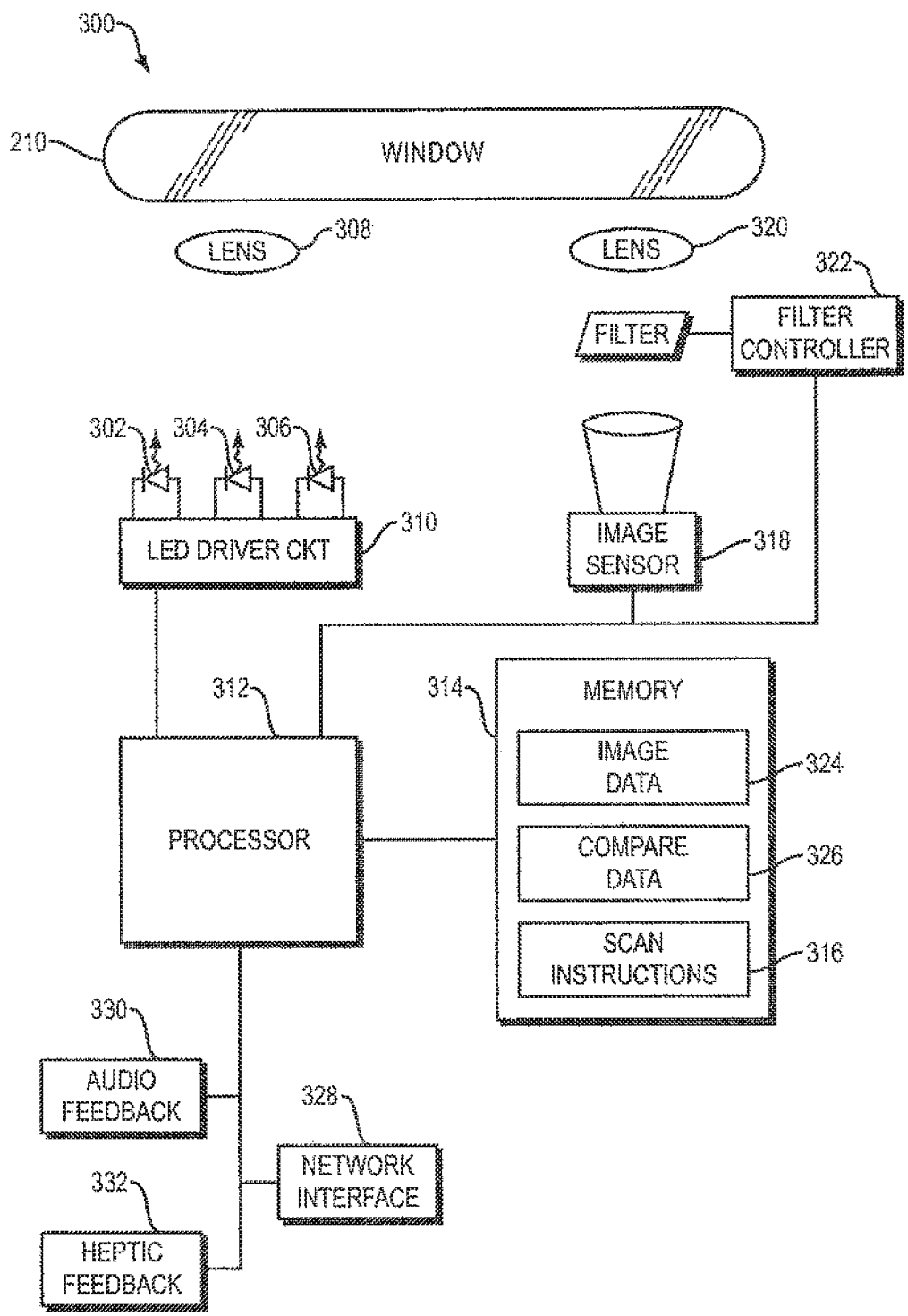
FIG. 3 illustrate a block diagram of a point-of-sale scanner system in accordance with an embodiment of the present invention.

A block diagram 300 of the relevant internal system components of the scanner 200 appears in FIG. 3. One or more light-emitting diodes ("LEDs") 302, 304, 306 may be used to generate light for transmission outward (from the point of view of the scanner 200) from the window 210. A first LED 302 may generate IR-wavelength light for use in scanning UPCs, and a second LED 304 may be used to generate UV-wavelength light (for use in illuminating an identification card with UV light). In some embodiments, a third LED 306 is used to generate visible-spectrum light (for use as, e.g., camera flash) to aid in the capture of visible-spectrum images; if natural ambient light is sufficient, however, the third LED 306 may not be included or may be selectively enabled. The LEDs 302, 304, 306 are illustrative only and not intended to be limiting; in other embodiment, multiple LEDs may be used for each singly-depicted LED 302, 304, 306 (configured as, for example, an LED string), and a single LED 302, 304, 306 may be used to generate different types of light. For example, the first LED 302 may be used to generate both IR-wavelength light and UV-wavelength light.

A lens 308 may be used to focus or otherwise direct light from one or more of the LEDs 302, 304, 306. In other embodiments, separate lenses 308 may be used for one or more of the LEDs 302, 304, 306. The lens 308 may focus IR-wavelength light from the first LED 302 into one or more narrow beams, for example, for use in scanning an UPC; the lens 308 may also or instead diffuse light from the second 304 or third 306 LEDs. In still other embodiments, no lens 308 is used with one or more of the LEDs 302, 304, 306.

An LED driver circuit 310 may be used to supply voltage and/or current to the LEDs 302, 304, 306 and may include, for example, a voltage or current regulator. The LED driver circuit 310 may be designed to drive the LEDs 302, 304, 306 in accordance with their design parameters, power requirements, and tolerances.

A processor 312 may be used to control the LED driver circuit 310. The processor 312 may be a microprocessor, microcontroller, FPGA, ASIC, or any other type of digital, analog, or mixed-signal control circuit. Instructions and data for use with the processor 312 may be stored in a memory 314. For example, the memory 314 may include instructions 316 for scanning a UPC and/or identification card; the instructions 316 may be written in, for example, C, C++, Python, assembly code, a custom language, or any other computer language. The memory 314 may be RAM, ROM, firmware, flash memory, or any other kind of volatile or non-volatile storage medium.

The system 300 further includes an image sensor 318 for capturing light received through the window 210. The image sensor may be a charge-coupled device ("CCD") or any other type of suitable image sensor, and may have a resolution of 640×480, 1024×768, or any other suitable resolution. A lens 320 may be used to focus incoming light on the image sensor 318; the lens may be the same as the first lens 308 or may be a different lens.

In one embodiment, a filter 322 filters the incoming light from the window 210 before it strikes the image sensor 310. For example, the filter 320 may filler UV-wavelength light such that, during a scan of a UPC, the image sensor 310 does not receive UV-wavelength light. This filtering may improve the accuracy with which UPCs are scanned and read.

In one embodiment, a filter controller 322 configures the filter 320 such that it filters incident light at a first point in time and does not filter light at a second point in time. For example, the processor 312 may instruct the filter 320 to filter UV light during the IR-wavelength scan of a UPC and instruct the filter 320 to not filter UV light during the scan of an identification card. The filter controller 322 may be a mechanical mechanism, such as a servo motor, that moves or rotates the filter 320. For example, the filter controller 322 may rotate the filter 320 by 90 degrees such that it allows light from the window 210 to pass through. The filter controller 322 may, in other embodiments, move the filler 320 laterally (e.g., perpendicularly with respect to the image sensor 318) to allow unfiltered light to strike the image sensor 318. In still other embodiments, the filter controller 322 is an electrical circuit that changes the properties of the filter 320 via the application of electrical signals to thereby allow for selective filtering of light incoming from the window 210. For example, the filter 320 may include a MEMS, LCD, LED, and/or piezoelectric layer that filters light when an electrical signal is applied via the filter controller 322 and does not filter light when the electrical signal is not applied (or vice versa).

Image data 324 from the image sensor 318 may be stored in the memory 314. The image data 324 may include raw data from the sensor 318 and/or any of a variety of image formats, such as JPEG, BMP, or TIFF. The memory 314 may further include comparison data 326. In one embodiment, a first image is taken of an identification card while it is under UV illumination (as provided by, for example, the second LED 304), and a second image is taken of the identification card while it is under illumination from natural or "white" light (as provided by ambient light and/or the third LED 306). The two images may be taken in either order. The processor 212 may then compare the first and second images to detect differences therebetween; the differences may be then compared against a library of images stored in the compare data 326 for a match. If a match is found, the identification card is deemed authentic. In another embodiment, only one image is taken of the identification card (while the identification card is illuminated with UV light); the processor 312 may then analyze the image to determine which portions luminesce in response to the UV light and which portions do not (by, for example, determining which pixels of the image fall within a color or luminosity range corresponding to UV excitation) and compare the detected portions to the library in the compare data 326. In another embodiment, if the processor 312 detects that no UV-luminescent regions are present in the identification card, the card it automatically deemed inauthentic.

The system 300 may include a network interface 328 for communication with other electronic devices or systems (such as the computer 100 depicted in FIG. 1). The network interface 328 may include hardware, software, and/or firmware for implementing Wi-Fi, ETHERNET, or any other networking protocol. Some or all of the functions described above may thus be performed remotely on the computer 100, a remote server, or any other system. For example, the processor 312 may transmit image data captured by the image sensor 318 and the image comparison and library look-up may be performed remotely.

In one embodiment, the system 300 includes an audio feedback element 330 (such as a speaker) and/or a haptic feedback element 332 (such as a buzzer or other vibrating element). The feedback elements 330, 332 may be used to signal to an operator of the scanner 200 that verification of an identification card is required. For example, if the operator scans the UPC of an item requiring verification, the scanner 200 may provide audio and/or tactile feedback to so inform the operator. Further feedback may be used to inform the operator of the successful scanning of the identification card with and/or without UV illumination and/or of the successful (or unsuccessful) validation of the identification card.

In one embodiment, in addition to identification-card validation, the processor 312 scans the text, photo, or other information on the identification card to determine the age and/or identity of the owner of the card. For example, the processor 312 may analyze the image data 324 corresponding to the identification card for the keywords "Date of Birth," "D.O.B.," or similar using image pattern matching, optical-character recognition, or similar techniques. When found, the processor 312 may search in the image for numbers corresponding to the owner's date of birth, detect those numbers, and determine the age of the owner. Optionally, the system 300 may communicate with another system or device (via the network interface 328) to determine if the age of the owner is sufficient to purchase the associated item. Similarly, the processor 312 may determine the name, address, driver's license number, social-security number, or other identifying information associated with the owner by scanning the image data 324 and communicate with another system to determine if the owner of the identification card is permitted to purchase a controlled item (such as pseudoephedrine) associated with a scanned UPC. The system 300 may provide audio and/or haptic feedback to the operator of the scanner 300 accordingly. As described above, some or all of these functions may be performed remotely (on, for example, the computer 100).

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of using a point-of-sale scanner, the method comprising:
   capturing, with the point-of-sale scanner, an infrared image of a bar code associated with an item for sale;
   determining, using a computer connected to the point-of-scale scanner, that the item for sale associated with the bar code is allowed for purchase by only a subset of customers;
   configuring an ultraviolet filter mounted within the point-of-scale scanner to allow the passage of ultraviolet light within;
   illuminating the identification card with ultraviolet light;
   capturing, with the point-of-sale scanner, an image of the identification card that includes a fluorescent response to the ultraviolet light;
   determining if the identification card is authentic by analyzing the captured image; and
   determining, based at least in part on determining if the identification card is authentic, if the customer is a member of the subset of customers allowed to purchase the item for sale.

2. The method of claim 1, further comprising configuring the ultraviolet filter to block the passage of ultraviolet light within prior to capturing the infrared image.

3. The method of claim 1, wherein determining if the identification card is authentic comprises detecting the presence or absence of ultraviolet-luminescent material in the identification card.

4. The method of claim 1, further comprising capturing, with the point-of-sale scanner, a second image of the identification card when the identification card is not illuminated with ultraviolet light, wherein determining if the identification card is authentic further comprises analyzing the second image.

5. The method of claim 4, wherein determining if the identification card is authentic comprises determining differences between the image and the second image and comparing the differences to data in a memory.

6. The method of claim 1, wherein the item for sale comprises an alcohol product, a tobacco product, or a drug product.

7. The method of claim 1, wherein the step of determining if the identification card is authentic is performed on the point-of-scale scanner, at a point-of-sale computer, or on a remote server computer.

8. The method of claim 1, further comprising providing audio or haptic feedback upon determining that the identification card is authentic.

9. A point-of-sale scanner comprising:
   a light source for providing infrared and ultraviolet light;
   an image sensor for capturing image data;
   a filter for filtering ultraviolet light;
   a filter controller for configuring the filter such that, in a first mode, the filter blocks ultraviolet light from striking the sensor and, in a second mode, permits ultraviolet light to strike the sensor; and
   a computer processor configured for controlling the light source, image sensor, and filter controller such that the point-of-sale scanner captures an image of a bar code associated with an item for sale while the light source illuminates the bar code with infrared light provided by the light source and while the filter filters ultraviolet light from the light source and, if the item for sale associated with the bar code is allowed for purchase by only a subset of customers, then the point-of-sale scanner captures an image of the identification card while the identification card is being illuminated by ultraviolet light provided by the light source and for transmitting image data captured by the image sensor to a remote computer for determining if the customer is a member of the subset of customers allowed to purchase the item for sale.

10. The system of claim 9, wherein the computer processor is further configured for controlling the light source, image sensor, and filter controller such that the point-of-sale scanner captures a second image of the identification card while the identification card is being illuminated by ambient light.

11. The system of claim 9, further comprising a point-of-scale computer in communication with the point-of-scale scanner.

12. The system of claim 10, further comprising a computer display in communication with the point-of-scale computer.

13. The system of claim 9, wherein the point-of-scale scanner further comprises a speaker for providing audio feedback.

14. The system of claim 9, wherein the point-of-scale scanner further comprises a vibrating element for providing haptic feedback.

15. The system of claim 9, wherein the point-of-scale scanner further comprises a computer memory for storing the image data.

16. The system of claim 9, wherein filter controller comprises a mechanism for moving the filter.

17. The system of claim 9, wherein filter controller comprises an electrical circuit for changing an electrical property of the filter.

18. The system of claim 9, wherein the light source comprises a first LED for providing infrared light and a second LED for providing ultraviolet light.

19. The system of claim 9, wherein the light source comprises an LED for providing both infrared and ultraviolet light.

* * * * *